US012342849B2

(12) United States Patent
Bosi et al.

(10) Patent No.: US 12,342,849 B2
(45) Date of Patent: Jul. 1, 2025

(54) APPARATUS FOR MANUFACTURING AN AEROSOL-GENERATING ROD

(71) Applicant: PHILIP MORRIS PRODUCTS S.A., Neuchatel (CH)

(72) Inventors: Luca Bosi, Modigliana (IT); Filippo Battisti, Modena (IT)

(73) Assignee: Philip Morris Products S.A., Neuchatel (CH)

( * ) Notice: Subject to any disclaimer, the term of this patent is extended or adjusted under 35 U.S.C. 154(b) by 481 days.

(21) Appl. No.: 17/762,547

(22) PCT Filed: Sep. 16, 2020

(86) PCT No.: PCT/EP2020/075893
§ 371 (c)(1),
(2) Date: Mar. 22, 2022

(87) PCT Pub. No.: WO2021/058352
PCT Pub. Date: Apr. 1, 2021

(65) Prior Publication Data

US 2022/0338530 A1 Oct. 27, 2022

(30) Foreign Application Priority Data

Sep. 23, 2019 (EP) .................................... 19198980

(51) Int. Cl.
*A24C 5/01* (2020.01)
*A24C 5/18* (2006.01)
(Continued)

(52) U.S. Cl.
CPC .................. *A24C 5/01* (2020.01); *A24C 5/18* (2013.01); *A24D 1/20* (2020.01); *H05B 6/105* (2013.01)

(58) Field of Classification Search
None
See application file for complete search history.

(56) References Cited

FOREIGN PATENT DOCUMENTS

WO WO 2016/184928 11/2016
WO WO-2016184928 A1 * 11/2016 ............ A24B 15/12
(Continued)

OTHER PUBLICATIONS

PCT Search Report and Written Opinion for Application No. PCT/EP2020/075893 dated Nov. 4, 2020 (9 pages).
(Continued)

*Primary Examiner* — Manley L Cummins, IV
(74) *Attorney, Agent, or Firm* — Mueting Raasch Group

(57) ABSTRACT

An apparatus for manufacturing an aerosol-generating rod (10), comprising an inserter (260) for guiding a continuous band of susceptor (40), the inserter comprising: an entrance-aperture; an exit-aperture; a channel between the entrance-aperture and the exit-aperture; and a rotating mechanism to rotate the exit-aperture around the longitudinal axis of the channel; a gathering mechanism to gather a continuous sheet of aerosol-generating material (20, 120) and the continuous band of susceptor from the inserter; and a wrapper to wrap the gathered material to form a continuous rod. A method using the apparatus to position a continuous band of a susceptor in an aerosol-generating material. A method of using the apparatus to manufacture an aerosol-generating rod.

15 Claims, 5 Drawing Sheets

(51) Int. Cl.
*A24D 1/20* (2020.01)
*H05B 6/10* (2006.01)

(56) References Cited

FOREIGN PATENT DOCUMENTS

| | | | | |
|---|---|---|---|---|
| WO | WO 2018/122320 | | 7/2018 | |
| WO | WO 2018/229086 | | 12/2018 | |
| WO | WO-2018229086 A1 | * | 12/2018 | ............... A24B 3/14 |

OTHER PUBLICATIONS

Extended European Search Report for Application No. 19198980.5 dated Mar. 30, 2020 (6 pages).

* cited by examiner

APPARATUS FOR MANUFACTURING AN AEROSOL-GENERATING ROD

This application is a U.S. National Stage Application of International Application No. PCT/EP2020/075893 filed Sep. 16, 2020, which was published in English on Apr. 1, 2021, as International Publication No. WO 2021/058352 A1. International Application No. PCT/EP2020/075893 claims priority to European Application No. 19198980.5 filed Sep. 23, 2019.

The present disclosure relates to an apparatus for manufacturing an aerosol-generating rod. More specifically, the present disclosure relates to an apparatus for manufacturing consumables for Heat not Burn (HnB) smoking devices. The present disclosure also relates to a method of positioning a continuous band of a susceptor in aerosol-generating material. The present disclosure further relates to a method of manufacturing an aerosol-generating rod.

Some electronic smoking articles use induction heating to heat up a susceptor. The susceptor then heats up an aerosol-generating substrate such as tobacco or homogenized tobacco sheets to generate an aerosol. Typically, the susceptor material is rectangular-shaped and is inserted inside a rod for aerosol-generating substrate using a thin sheath-like guide. Importantly for the efficiency of the use of the aerosol-generating consumables, the susceptor should be inserted central of the aerosol-generating consumables, on the central longitudinal axis of the rod. The guide is placed in a center of a funnel together with a sheet of aerosol-generating material. Both the susceptor and the aerosol-generating material are pulled through the funnel and compressed into an aerosol-generating rod. The guide places the susceptor into the centre of the aerosol-generating rod coming out of the funnel. The aerosol-generating rod is then wrapped in a wrapping material. The rod is then cut into small plugs. The plugs are combined with other parts to create aerosol-generating consumables for the induction heating device.

It would be desirable to provide an apparatus for manufacturing an aerosol-generating article, that reduces the bending of the susceptor as the continuous aerosol-generating rod is cut.

According to the present invention there is provided an apparatus for manufacturing an aerosol-generating rod. The apparatus comprises an inserter for guiding a continuous band of susceptor. The inserter comprises: an entrance-aperture; an exit-aperture; and a channel between the entrance-aperture and the exit-aperture. The inserter also comprises a rotating mechanism to rotate the exit-aperture around the longitudinal axis of the channel. The apparatus further comprises a gathering mechanism to gather a continuous band of aerosol-generating material and the continuous band of susceptor from the inserter. The apparatus also comprises a wrapper to wrap the gathered material to form a continuous rod. In some examples, the apparatus comprises a gathering mechanism to gather more than one continuous band of aerosol-generating material with the continuous band of susceptor from the inserter. For example, the gathering mechanism may gather two continuous bands of aerosol-generating material with the continuous band of susceptor from the inserter positioned between the continuous bands of aerosol-generating material.

Thus, the band of susceptor is inserted in the entrance-aperture of the inserter and exits the exit-aperture of the inserter at a user-determined angle. For example, the exit-aperture can be rotated such that the band of susceptor is positioned at an angle that is determined by the user. The user can select an angle that reduces the impact of the cutter in the cutting process or reduce the bending of the susceptor as the continuous rod is cut into plugs. The ability to offset the exit-aperture (and thus the position of the band of susceptor) is particularly advantageous because variations of pressures exerted by aerosol-generating material on the susceptor can be modified. The ability to offset the exit-aperture is beneficial because the bending of the susceptor due to various blade types and manufacturing parameters can be limited or accounted for.

Providing an apparatus according to the present invention for manufacturing an aerosol-generating rod is advantageous because resistance to bending is improved. Cutting of the rod into smaller plugs is typically carried out using a rotary knife. Accordingly, the invention may prevent that the impact of the blade on a susceptor may alter the orientation, position or shape of the susceptor inside the rod. For example, the susceptor may in some instances deform into a curved shape such as that shown in FIG. 1 under impact from a blade. The apparatus for manufacturing an aerosol-generating rod increases the efficiency of using aerosol-generating materials. Moreover, the waste of aerosol-generating material is reduced. The consistency of the aerosol-generating material is also improved. Additionally, the apparatus according to the present invention facilitates the use of blades having different configurations. The apparatus also facilitates the use of blades that can cut at different angles.

By providing an apparatus having an inserter comprising a rotating mechanism that rotates the exit-aperture around the longitudinal axis of the channel, the deformation of the susceptor due to angular offsets between the susceptor and the blade profile is reduced. Additionally, the angle made by the plane of the susceptor can be finely adjusted. The provision of angular adjustment allows slight variations of pressure exerted by the aerosol generating material onto the susceptor to be adjusted. For example, variations of pressure may occur within a batch of aerosol-generating material produced. Variations of pressures may also occur, for example, between one bobbin of aerosol-generating material to the next bobbin.

In some preferred embodiments the inserter further comprises a securing mechanism to secure the rotation of the exit-aperture at a particular position. Thus, the angle of the exit-aperture can be locked in place. This is particularly advantageous when for example, an angle of the band of susceptor to limit or reduce bending for a particular cutting setup has been found. The arrangement of the exit-aperture can be selectively secured in place such that the angle can be fixed across prolonged use of the apparatus.

In specific embodiments, the securing mechanism to secure the rotation of the exit-aperture at a particular position is by a releasable securing mechanism. In this way, the angle of the exit-aperture can be selectively fixed in place. Then, when the rotation of the exit-aperture needs to be varied, such as in the case where the position of the band of susceptor needs to be changed, the securing mechanism can be released, and the angle can be varied.

In some embodiments, the inserter further comprises a rotating mechanism to rotate the entrance-aperture.

In some embodiments, the inserter further comprises a securing mechanism to secure the rotation of the entrance-aperture at a particular position. Thus, the angle of the entrance-aperture can be locked in place.

In specific embodiments, the securing mechanism to secure the rotation of the entrance-aperture at a particular position is by releasable securing mechanism. In this way, the angle of the entrance-aperture can be selectively fixed in place. Then, when required, the rotation of the entrance-aperture needs to be varied.

In some embodiments, the channel of the inserter is funnel shaped decreasing in diameter towards the exit-aperture. In this way, the susceptor material can converge towards the exit-aperture.

In some embodiments, the exit-aperture is a slit. This is particularly advantageous as the band of susceptor exiting through the exit-aperture may be substantially planar in shape, having a larger surface area to promote induction heating of its surrounding area in the aerosol-generating consumable. A planar band of susceptor is easy to manufacture, transport, store and dispense. It is advantageous to have the exit-aperture in the form of a slit because this allows the susceptor with a corresponding cross-sectional shape (when cut across the longitudinal length) to be guided. The exit-aperture may be the smallest size necessary to guide the susceptor while still allowing the easy passage of the susceptor. This allows the aerosol-generating substrate to easily form around the susceptor. Another benefit of this arrangement is that the exit-aperture corresponds to a planar susceptor.

In alternative embodiments, the exit-aperture is cross-shaped. It is advantageous to have the exit-aperture in the shape of a cross because this allows the susceptor to be guided. This allows the aerosol-generating substrate to easily form around the susceptor. This arrangement of the exit-aperture corresponds to a planar susceptor. The susceptor can be guided through the cross-shaped exit-aperture in more than one orientation. More specifically, the susceptor can be guided through the exit-aperture in a first orientation and second orientation, angularly offset from one another by 90 degrees. The cross-shaped aperture may also allow to limit the degree of possible rotation of the inserter to 90 degrees instead of 180 degrees.

In some embodiments, the inserter comprises a transition portion where the profile of the inserter changes from tubular to rectangular in the downstream direction. In some examples, the transition portion has a frustoconical profile. In some examples, the channel of the inserter is funnel shaped, decreasing in diameter towards the exit-aperture in the downstream direction. In some examples, the transition portion is a separate piece. Advantageously, such a separate piece is made of a low friction material or comprises a low friction coating. Advantageously, such a separate piece is made of a ceramic.

In some embodiments, the entrance-aperture is circular. By having an entrance-aperture that is circular in shape, inserting the band of susceptor into the inserter becomes easier.

In alternative embodiments, the entrance-aperture is a slit.

In some embodiments, the entrance-aperture is cross-shaped.

In some embodiments, the inserter further comprises a goniometer. In specific embodiments, the goniometer has an aperture for which the susceptor exiting the inserter may pass through, the aperture of the goniometer being rotatable around the longitudinal axis of the channel. In this way, the angle of the susceptor can be precisely determined. An angle can be chosen to reduce the bending of the susceptor in the cutting process.

In some preferred embodiments, the inserter further comprises means such that when the goniometer rotates around the longitudinal axis of the channel there is also rotation of: the susceptor; the exit-aperture; the entrance-aperture; or any combination thereof. This means to rotate one or more components, on rotating the goniometer is, in some embodiments, the rotation mechanism. The rotation mechanism may comprise one or more rotation mechanisms. Where the rotation mechanism comprises more than one rotation mechanism, each rotation mechanism may rotate independently, or not independently from other rotation mechanisms. In other embodiments the means to rotate one or more components at the same time is the susceptor. The rotation mechanism of the goniometer, or the rotation mechanism of any other component may be configured and positioned such that on rotation of one rotation mechanism other components (maybe all) may also rotated. By allowing rotation of the susceptor or the exit-aperture or the entrance-aperture, rotating the goniometer simultaneously rotates the respective component. For example rotating the exit-aperture will rotate the band of susceptor, if the band of susceptor is placed inside the exit-aperture. In other examples rotating the band of susceptor may rotate the exit-aperture, or entrance-aperture, or both the exit-aperture and entrance-aperture. Rotation of the entrance-aperture may, for example, provide additional support to the susceptor or to give a gradual orientation change along the length of the susceptor. In alternative examples when the goniometer is rotated it may rotate the band of susceptor, the entrance-aperture, the exit-aperture, or any combination of the entrance-aperture, exit-aperture or band of susceptor. The rotation of one component, for example goniometer, entrance-aperture or exit-aperture, may subject another component to the same degree of rotation, in length and direction. The rotation mechanism for any of the goniometer, the entrance-aperture or the exit-aperture, may comprise its own securing mechanism.

According to the present invention there is also provided a method of positioning a continuous band of a susceptor in aerosol-generating material. The method comprises the steps of: providing a continuous band of susceptor; providing a continuous sheet of aerosol-generating material; providing an inserter, wherein the inserter comprises: an entrance-aperture; an exit-aperture; a channel between the entrance-aperture and the exit-aperture; and wherein the exit-aperture is rotatable around the longitudinal axis of the channel. The method also comprises the step of positioning the continuous band of susceptor material through the entrance-aperture of the inserter, along the channel of the inserter and through the exit-aperture of the inserter to exit the inserter. The method further comprises the step of rotating the exit-aperture of the inserter to the desired angle whereby the susceptor at the exit end of the inserter is also rotated. The method also comprises the step of securing the exit-aperture of the inserter at the desired angle. The method comprises the step of gathering the continuous sheet of aerosol-generating material and the continuous band of susceptor from the inserter. The method also comprises the step of wrapping the gathered material to form a continuous rod.

Thus, the band of susceptor is inserted in the entrance-aperture of the inserter and exits the exit-aperture of the inserter at a user-determined angle. For example, the exit-aperture can be rotated such that the band of susceptor is positioned at an angle that is determined by the user. The user can select an angle that reduces the impact of the cutter in the cutting process, or reduces the bending of the susceptor as the continuous rod is cut into plugs. The ability to offset the exit-aperture and thus the position of the band of susceptor is particularly advantageous because variations of pressures exerted by aerosol-generating material on the susceptor can be modified. Bending of the susceptor due to various blade types and manufacturing parameters can be limited or accounted for. Then, when an angle of the band of susceptor to limit bending for a particular cutting setup has been found, the exit-aperture can be selectively secured in place such the angle can be fixed across prolonged use.

In some preferred embodiments, the method of positioning a continuous band of susceptor in an aerosol-generating material further comprises the step of using a goniometer to measure the angle of the continuous band of susceptor as it exits the inserter through the exit-aperture of the inserter. In this way, the angle of the susceptor can be precisely determined and as such, an angle can be chosen to reduce the bending of the susceptor in the cutting process.

In specific embodiments, the method further comprises the step of placing the continuous band of susceptor through an aperture in the goniometer wherein the aperture of the goniometer is rotatable around the longitudinal axis of the channel of the inserter, such that, the continuous band of susceptor inside the aperture of the goniometer, the continuous band of susceptor in the exit-aperture of the inserter and the exit-aperture of the inserter, are rotated by the same angle as that of the aperture of the goniometer. This provides simultaneous rotation of the continuous band of susceptor inside the aperture of the goniometer, the band of susceptor in the exit-aperture of the inserter, and the exit-aperture.

In specific embodiments, the method further comprises the step of securing the exit-aperture of the inserter at a particular angle such that the susceptor exits the inserter at that particular angle, for example, before the continuous band of susceptor is gathered with the aerosol-generating material. That is, the exit-aperture of the inserter is secured at a particular angle before the continuous band of susceptor is gathered completely with the aerosol-generating material. More specifically, gathering of the continuous band of the susceptor with the aerosol-generating materials, in some examples, begins upstream from the inserter, but is only completely or fully gathered until the exit-aperture of the inserter is secured at the desired angle. Thus, the particular angle can be selected by the user corresponding to a reduced bending of the susceptor material. The same angle can be locked in place such that the reduced bending of the susceptor material can be prolonged throughout the manufacturing operation.

In specific embodiments, the method further comprises the step of removing the goniometer after the exit-aperture of the inserter is secured, and before the continuous band of susceptor and aerosol-generating material is gathered. Thus, the goniometer need not be permanently attached to the inserter. The removal of the goniometer provides more working space for subsequent process steps—that is, for the gathering of the susceptor and aerosol-generating material. The removal of the goniometer is particularly useful where the aerosol-generating material is gathered all around the inserter.

According to the present invention there is further provided a method of manufacturing an aerosol-generating rod. The method comprises the steps of providing a continuous band of susceptor and positioning the continuous band of susceptor. The step of positioning the continuous band of susceptor comprises positioning the continuous band of susceptor inside an inserter. The inserter has an exit-aperture, an entrance-aperture, a channel between the entrance-aperture and exit-aperture, and the inserter further comprises a rotation mechanism to rotate the exit-aperture around the longitudinal axis of the channel. In some examples, when the susceptor material is in place in the entrance-aperture and the exit-aperture and in some examples in the goniometer, the susceptor has enough rigidity that when one component (entrance-aperture, exit-aperture, band of susceptor or goniometer) that rotating the band of susceptor at one position can enable rotation of one or more or all other components. The method further comprises the step of inserting the continuous band of susceptor through the inserter, first through the entrance-aperture, along the channel and then through the exit-aperture. The method also comprises the step of rotating the exit-aperture with the continuous band of susceptor in the exit-aperture, to a desired angle. The method further comprises the step of securing the exit-aperture at the desired angle. The method comprises the step of providing a continuous sheet of aerosol-generating material. The method also comprises the step of gathering the continuous sheet of aerosol-generating material and the continuous band of susceptor. The method further comprises the step of wrapping the gathered material to form a continuous rod.

Thus, the band of susceptor is inserted in the entrance-aperture of the inserter and exits the exit-aperture of the inserter at a user-determined angle. For example, the exit-aperture can be rotated such that the band of susceptor is positioned at an angle that is determined by the user. The user can select an angle that reduces the impact of the cutter in the cutting process, or reduce the bending of the susceptor as the continuous rod is cut into plugs. The ability to offset the exit-aperture and thus the position of the band of susceptor is particularly advantageous because variations of pressures exerted by aerosol-generating material on the susceptor can be modified. Bending of the susceptor due to various blade types and manufacturing parameters can be limited or accounted for.

In some preferred embodiments, the method of manufacturing an aerosol-generating rod further comprises the step of: using a goniometer to measure the angle of the susceptor, as it exits the inserter; enters the inserter; or both enters and exits the inserter. Using a goniometer to measure the angle of the susceptor, as it exits the inserter; enters the inserter; (or both enters and exits the inserter), is advantageous as the angle of the susceptor can be precisely determined. An angle can be chosen to reduce the bending of the susceptor in the cutting process.

In specific embodiments, the method further comprises the step of rotating the goniometer, the continuous band of susceptor, the exit-aperture, the entrance-aperture, or any combination thereof.

In specific embodiments, the step of positioning the continuous band of susceptor comprises positioning the profile of the continuous band of susceptor in a central position of an aerosol-generating material. By positioning the profile of the continuous band of susceptor in a central position, the susceptor may uniformly heat the surrounding aerosol-generating material, thus improving the efficiency of the use of the aerosol-generating consumables. By positioning the profile of the continuous band of susceptor in a central position of an aerosol-generating material, there is maybe a more uniform heating of the aerosol-generating material. The efficiency of using aerosol-generating materials is therefore improved. Moreover, the waste of aerosol-generating material is reduced. The consistency of the aerosol-generating material is also improved.

In specific embodiments, the method of manufacturing an aerosol-generating rod further comprises the step of forming, at least partially, a channel in an aerosol-generating material and positioning a continuous band of susceptor in the channel. By forming, at least partially, a channel in an aerosol-generating material and positioning a continuous band of susceptor in the channel, the channel formed in the aerosol-generating material provides a means for positioning the susceptor therein.

In specific embodiments, the method of manufacturing an aerosol-generating rod further comprises the step of guiding the continuous band of susceptor within the inserter. By having a step of guiding the continuous band of susceptor within the inserter, the potential of susceptor blockage within the inserter is decreased. This may reduce downtime in operation.

In specific embodiments, the method of manufacturing an aerosol-generating rod further comprises the step of supporting the continuous band of susceptor within the inserter. Thus, structural support is provided to the band of susceptor, reducing wear or damage, and improving the quality of the susceptor. In some embodiments the support to the susceptor may be from the entrance-aperture or the exit aperture or both the entrance-aperture and exit-aperture. In some embodiments the inserter further comprises a conveyor to support the susceptor between the entrance-aperture and the exit-aperture. In specific embodiments the conveyor comprises an endless belt. In specific embodiments the conveyor is driven.

In specific embodiments, the method of manufacturing an aerosol-generating rod further comprises the step of rotating and releasably securing the exit-aperture of the inserter. In specific embodiments, the method comprises the step of rotating and releasably securing the entrance-aperture of the inserter. In specific embodiments, the method comprises the step of rotating and releasably securing the susceptor. In specific embodiments, the method comprises the step of rotating and releasably securing any combination of: the exit-aperture of the inserter; the entrance-aperture of the inserter; and the susceptor. This arrangement selectively secures the respective part in place such the angle can be fixed across prolonged use of the apparatus.

The band of susceptor can be fed through the inserter by the pulling action of a mechanism downstream of the inserter. The inserter need not have any mechanism to provide the force to move the band of susceptor along the channel between the entrance-aperture and exit-aperture. Alternatively some embodiments comprise a drive mechanism to move the susceptor along the channel from the entrance-aperture to the exit-aperture. In some embodiments, the band of susceptor can be fed through the inserter by a pushing action of a mechanism upstream of the inserter. In some embodiments, the band of susceptor can be fed through the inserter by a pulling action of a mechanism downstream of the inserter, and by a pushing action of a mechanism upstream of the inserter.

Also according to the present invention there is provided a kit of parts to an apparatus for manufacturing an aerosol-generating rod, further comprising a goniometer.

For purposes of the present disclosure, as used herein the term "angle" is used to describe an angular displacement between two planar surfaces, such as between two planes. For purposes of the present disclosure, a positive angle—greater than zero (>0), denotes rotation in the anticlockwise direction and a negative angle—less than zero (<0), denotes rotation in the clockwise direction. For example, an angle of 30 degrees between the entrance-aperture of the inserter and the exit-aperture of the inserter is used to describe the exit-aperture being offset from entrance-aperture by 30 degrees in the anticlockwise direction. The angle may also be in relation to a static reference such as the horizontal. By way of example, an angle of the exit-aperture of 15 degrees from the horizontal is used to describe an exit-aperture that is angularly or rotationally displaced from the horizontal by 15 degrees in the anticlockwise direction.

As used herein, the term "aerosol-generating article" is used to describe an article that is able to generate, or release an aerosol. Often an aerosol-generating article is rod shaped.

As used herein, the term "aerosol-generating device" is used to describe a device to be used with an aerosol-generating article to enable the generation, or release, of an aerosol, typically from the aerosol-generating article.

As used herein, the term "aerosol-generating material" is used to describe a material that assists in, or is capable of, generating or releasing an aerosol, for example, cast tobacco leaf. The term also includes a material that acts as a carrier to an aerosol-generating substrate, that assists in the release of an aerosol from the aerosol-generating substrate.

As used herein, the term "aerosol-generating substrate" is used to describe a substrate that is capable of generating or releasing an aerosol, for example cast leaf tobacco.

As used herein, the term "crimped" denotes a material having a plurality of ridges or corrugations. In some examples, these ridges or corrugations are parallel. It also includes the process of making a material crimped. The ridges may be longitudinal, transverse, angular, straight, waved, continuous, interrupted or any combination thereof. Longitudinal ridges are preferred as they will help the gathering of the material in a more defined way. The longitudinal ridges also improve the formation of flow channels, the homogenous distribution of flow channels and maintaining the flow channels in the gathered material, in comparison to uncrimped or otherwise crimped sheets. Gathered material will typically be the continuous sheet of aerosol-generating material and the continuous band of susceptor.

As used herein, the term "garniture" is used to describe a part of an apparatus or an assembly used to wrap the core of an aerosol-generating rod. For example, the garniture assembly may have a formation channel wherein a web is wrapped around the core of an aerosol-generating rod.

As used herein, the term "gather" or "gathered" is used to describe the convoluting, folding, or otherwise compressing or constricting of a material (often a sheet, or fibres, or textile) in a direction substantially transversely to the downstream direction of the apparatus. The term also includes the compressing or constricting of threads in a direction substantially transversely to the downstream direction of the apparatus.

As used herein, the term "goniometer" is used to describe an instrument that is capable of measuring angular displacements, for example between two surfaces or between two planes. In some examples, markings are included at the entrance-apertures and exit-apertures such that the goniometer can measure angular displacements.

As used herein, the term "inductive heating" or "induction heating" is used to describe the process of heating an object using electromagnetic induction. Induction heating may be carried out without contacting a heat source, using eddy currents, for example.

As used herein, the term "inserter" is used to describe a device used to assist in placing or locating one object inside another. For example, an inserter is used to describe a device that places a susceptor inside a continuous rod, or rod plug for an aerosol-generating consumable.

As used herein, the term "longitudinal axis to the channel" is used to describe an axis in the direction between the proximal and distal ends of channel.

As used herein, the term "sheet" or "sheet material" is used to describe a generally planar, laminar element wherein its width and length are substantially greater than its thickness. For example the continuous sheet of aerosol-generating material.

As used herein, the term "slit" is used to describe an opening that generally has one dimension substantially greater than another dimension.

As used herein, the term "susceptor" is used to describe a material that is able to convert electromagnetic energy into heat. This includes metal, for example, aluminium.

Any of the features or steps described herein in relation to one embodiment, aspect or example, of the apparatus (including the method) for manufacturing an aerosol-generating rod, the method of positioning a continuous band of a susceptor in an aerosol-generating material, or an aerosol-generating rod thereof of any of the apparatus (including the method) for manufacturing an aerosol-generating rod, the method of positioning a continuous band of a susceptor in an aerosol-generating material, or an aerosol-generating rod, may be equally applicable to any embodiment, aspect or example of any of the aerosol-generating material, the apparatus (including the method) for manufacturing an aerosol-generating rod, and the method of positioning a continuous band of a susceptor in an aerosol-generating material.

Reference will now be made to the drawings, which depict one or more aspects described in this disclosure. However, it will be understood that other aspects not depicted in the drawings fall within the scope of this disclosure. Like numbers used in the figures refer to like components, steps and the like. However, it will be understood that the use of a number to refer to a component in a given figure is not intended to limit the component in another figure labeled with the same number. In addition, the use of different numbers to refer to components in different figures is not intended to indicate that the different numbered components cannot be the same or similar to other numbered components. The figures are presented for purposes of illustration and not limitation. Schematic drawings presented in the figures are not necessarily to scale.

Figure 1:
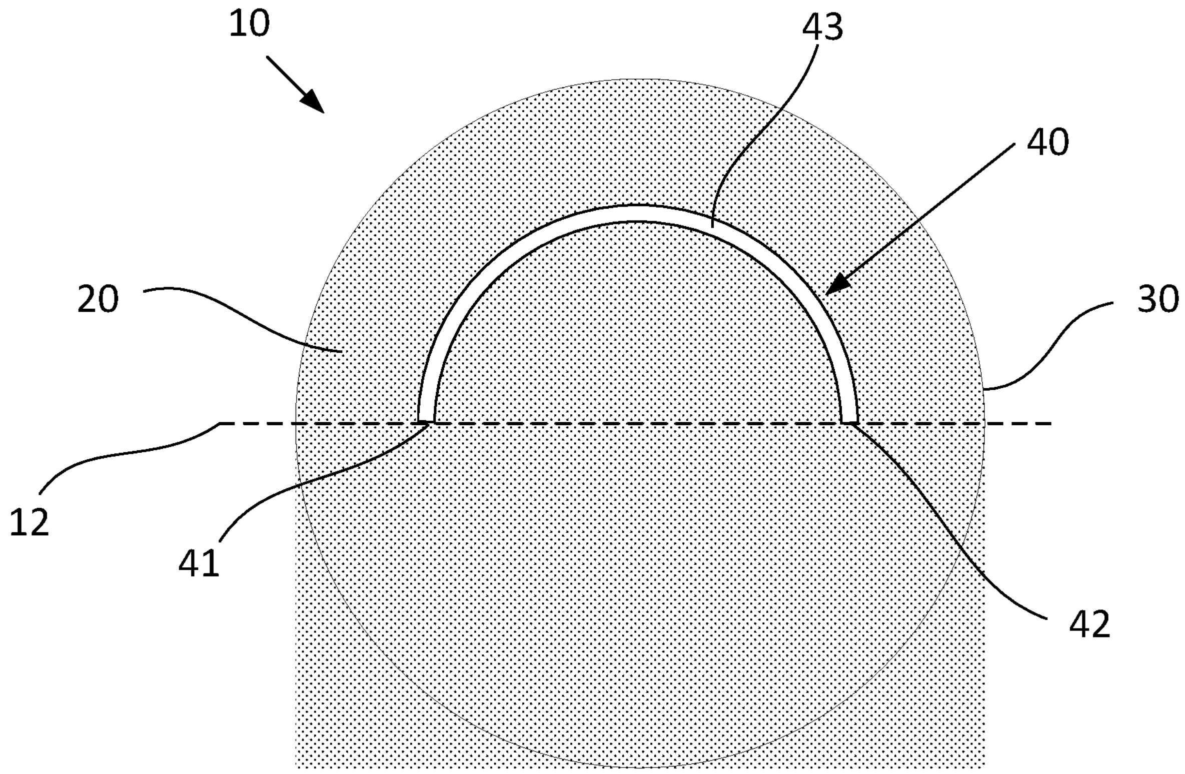
FIG. 1 is a schematic side view of a continuous rod after being cut, showing a susceptor inside aerosol-generating consumable.

FIG. 1 illustrates an example of a continuous rod 10. The continuous rod 10 is tubular in shape, having a generally circular section defined by an outer wall formed from a wrapper 30. The rod 10 is filled with aerosol-generating material 20. In this example, the rod 10 is filled with tobacco cast leaf 20 (TCL). The rod 10 could be filled with a different aerosol-generating material other than tobacco cast leaf. A band of susceptor 40 is located in the centre of the continuous rod 10. The band of susceptor 40 has a first end 41, a second end 42, and a main body 43. The main body 43 extends between the first end 41 and the second end 42. The main body 43 has a curved "U" shape formed during the cutting process of the continuous rod 10. Before the cutting process, the susceptor 40 is generally planar. During cutting, a rotary cutter (not shown) impacts the band of susceptor 40 and deforms the susceptor 40 such that the main body 43 has a curved profile. The band of susceptor 40 is in close proximity of the aerosol-generating material 20. In this particular example, the first end 41 of the band of susceptor 40 and the second end 42 of the band of susceptor 40 are located on a centreline 12 of the continuous rod 20. Before the cutting process, the band of susceptor 40 has a planar shape which is entirely located on the centreline 12 of the continuous rod 10. During cutting, impact from the blade of the cutter deforms the main body 43 away from the centreline 12 of the continuous rod 20. In use, an alternative magnetic field creates eddy currents on the band of susceptor 40 so that the band of susceptor 40 is heated. Since the band of susceptor 40 is placed inside or within close proximity of the aerosol-generating material 20, the band of susceptor 40 heats the surrounding aerosol-generating material 20. However, since the main body 43 of the band of susceptor 40 is deformed away from the centre of the continuous rod 20, inefficiencies are created. That is, aerosol-generating material 20 that is further away from the band of susceptor 40 is heated to a lesser degree, or may not generate aerosol efficiently.

Figure 2:
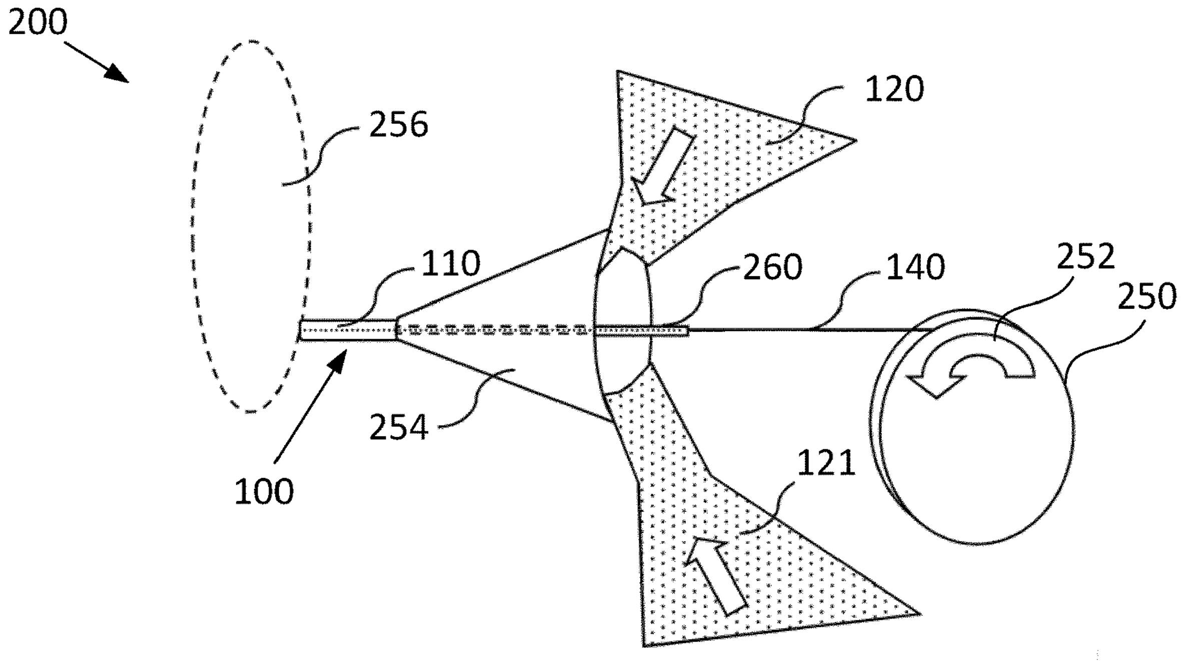
FIG. 2 is a schematic view of the apparatus used to manufacture an aerosol-generating rod.

FIG. 2 illustrates a schematic diagram of the apparatus 200 used to manufacture an aerosol-generating rod 100. A continuous band of susceptor 140 is supplied from a bobbin 250 by rotating the bobbin in the direction generally indicated by the arrow 252. The susceptor 140 is a planar rectangular shape and is made of metal in this example. In this example the susceptor is much longer in length than in width. The susceptor 140 could also be a different shape. The susceptor could also comprise different materials. The susceptor 140 is inserted into an inlet end (not shown) of an inserter 260. The inserter 260 also has an outlet (not shown). The inserter 260 places the susceptor 140 into a funnel 254. A first aerosol-generating sheet 120 and a second aerosol-generating sheet 121 are also pulled into the funnel 254 such that the susceptor 140 is placed between the first aerosol-generating sheet 120 and the second aerosol-generating sheet 121. The first aerosol-generating sheet 120, the second aerosol-generating sheet 121 and the susceptor 140 therebetween, are then compressed into a rod 110. In other examples, the inserter 260 places the susceptor 140 into a funnel 254 and a single aerosol-generating sheet is gathered around the susceptor. Thus, an aerosol-generating sheet is pulled into the funnel 254 such that the susceptor 140 is fathered with the single aerosol-generating sheet. The rod 110 has substantially the required diameter of the final aerosol-generating consumables. The rod 110 is then wrapped in a wrapping material (not shown) and is then cut by a rotating cutter 256 into plugs (not shown) of the desired length. In this example, the continuous rod 110 is cut into plugs using a rotary cutter 256. Other means can be used to cut the continuous rod 110, such as a knife, shears or a guillotine blade. The first aerosol-generating sheet 120 and the second aerosol-generating sheet 121 are both tobacco cast leaf in this example. The first and second aerosol-generating sheets 120,121 could be other materials. The first aerosol-generating sheet 120 and the second aerosol-generating sheet 121 could be different materials. In this example, the tobacco cast leaf sheets 120,120 are uncrimped. In other examples, the tobacco cast leaf sheets 120,121 are crimped.

Figure 3:
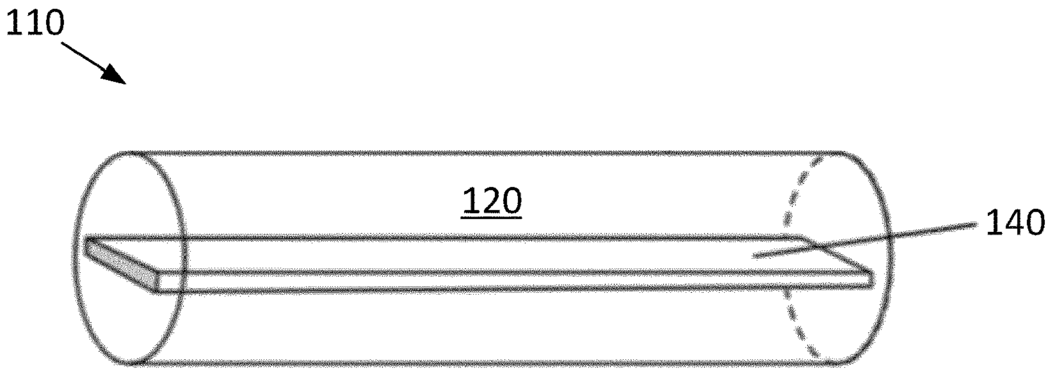
FIG. 3 illustrates a schematic perspective view of a band of susceptor inside a continuous rod.

FIG. 3 illustrates a continuous rod 110 having a cylindrical elongate shape. The continuous rod 110 has a susceptor 140 having a planar rectangular shape. The band of susceptor 140 extends along the length of the continuous rod 110 in this example. In some examples, the susceptor 140 extends partially along the length of the continuous rod 110. In order to improve the efficiency of the use of aerosol-generating consumables, the susceptor 140 is placed substantially in the middle of the continuous rod 110. For example, the susceptor 140 can be placed in the middle of the continuous rod 110 in the horizontal plane. In alternative examples, the susceptor 140 can be placed in the middle of the continuous rod 110 in the vertical plane. By placing the susceptor 140 substantially in the middle of the continuous rod 110, aerosol-generating material 120 is uniformly spread on either side of the susceptor 140. The aerosol-generating material 120 can be heated to produce an aerosol. The orientation of the susceptor 140 in the aerosol-generating rod 110 can be arranged such that the impact of the rotary cutter (256, FIG. 2) on the susceptor 140 is reduced. The orientation of the susceptor 140 within the aerosol-generating rod 110 can also be arranged such that the deformation or displacement of the susceptor 140 is reduced. The alignment of the susceptor or the orientation of the susceptor 140 can be arranged by orientating the inserter 260, as will be described below.

Figure 4:
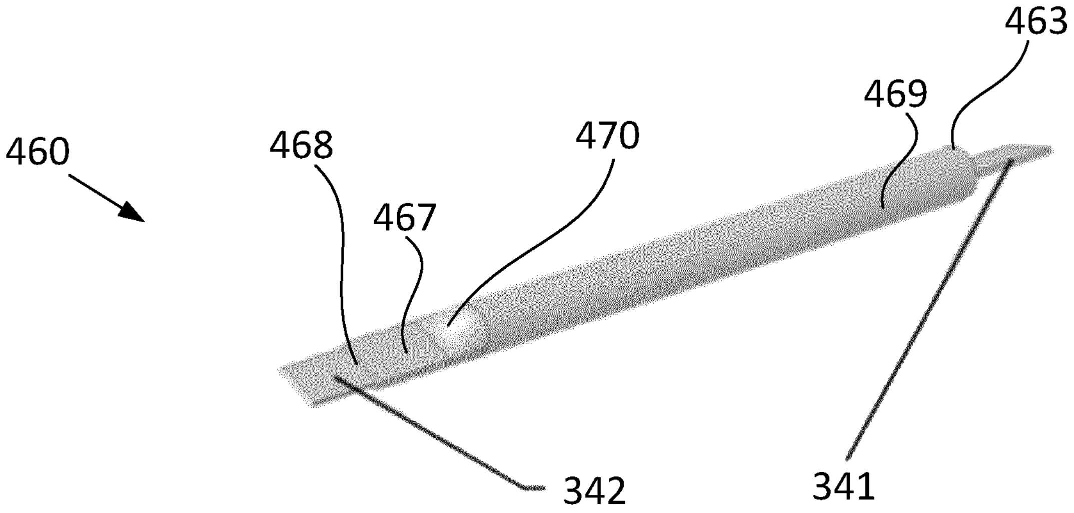
FIG. 4 is a schematic perspective view of the inserter with a susceptor inserted therein.

FIG. 4 illustrates an example of an inserter 460. The inserter 460 has a longitudinal axis and is generally elongate in shape. The inserter 460 is hollow, having a tubular shape at an inlet end 463. The inserter 460 has an outlet end having a rectangular inner and outer surface. Towards the upstream end, the inserter has a starting section having a tubular entrance aperture 463. Towards the downstream end, the inserter 460 has an end section 467. The end section 467 has an exit aperture 468. The end section 467 in this example is 2.15 millimetres (mm) long. A channel 469 (also known as guide tube 469) extends between the entrance-aperture 463 and the exit-aperture 468. The channel 469 in this example is 400 millimetres (mm) long. The exit-aperture 468 has a slit shape in this example. In other examples, the exit-aperture 468 has a different shape such as an ellipse or a cross. A substantial portion of the channel 469 starting from the upstream end of the inserter 460 is tubular in shape. The inserter 460 has a transition portion 470 where the profile of the inserter 460 changes from tubular to rectangular in the downstream direction. In some examples, the transition portion 470 has a frustoconical profile. In some examples, the channel 469 of the inserter 460 is funnel shaped, decreasing in diameter towards the exit-aperture 468 in the downstream direction. In some examples, the transition portion 470 is a separate piece made of ceramic. This is particularly useful since the transition portion can be interchanged depending on application. The transition portion 470 can also be replaced without needing to replace the entire construction, for example, due to wear or damage.

A susceptor 340 is inserted inside the inserter 460. The inserter 460 is rotated about its longitudinal axis such that asymmetric portions of the inserter 460 are angled. That is, the transition portion 470, the end section 467 and the exit-aperture 468 are rotated about the longitudinal axis of the inserter 460. Since the transition portion 470, the end section 467 and the exit-aperture 468 are not symmetrical, rotation of the inserter 460 causes the transition portion 470, the end section 467 and the exit-aperture 468 to be angled relative the channel 469 and the entrance-aperture 463. In this example, the inserter 460 is rotated by an angle of 45 degrees in the clockwise direction (when looking from the entrance-aperture 463 side of the inserter 460 in the downstream direction) about its longitudinal axis relative to the horizontal. The inserter 460 could also be rotated by a different angle such as 15 degrees, 30 degrees, 60 degrees or 75 degrees, or any suitable angle. The inserter 460 could also be rotated in the anticlockwise direction (when looking from the entrance-aperture 463 side of the inserter 460 in the downstream direction). A first end 341 of the susceptor 340 is held in the entrance-aperture 463 of the inserter 460 and a second end 342 of the susceptor 340 is held in the exit-aperture 468. When the inserter 460 is rotated, the second end 342 of the susceptor 340 is rotated with the end section 467 about the longitudinal axis of the inserter 460. This causes the second end 342 of the susceptor 340 to be angularly displaced from the first end 341 of the susceptor 340. The second end 342 of the susceptor 340 is rotated relative to the first end 341 of the susceptor 340. In some examples, the entrance-aperture 463 is not specifically angled. For example, the inlet end of the inserter 460 may be tubular in shape. Susceptor 340 is inserted at any angle into the entrance-aperture 463 and is then rotated to the desired angle set by the exit-aperture 468.

Figure 5:
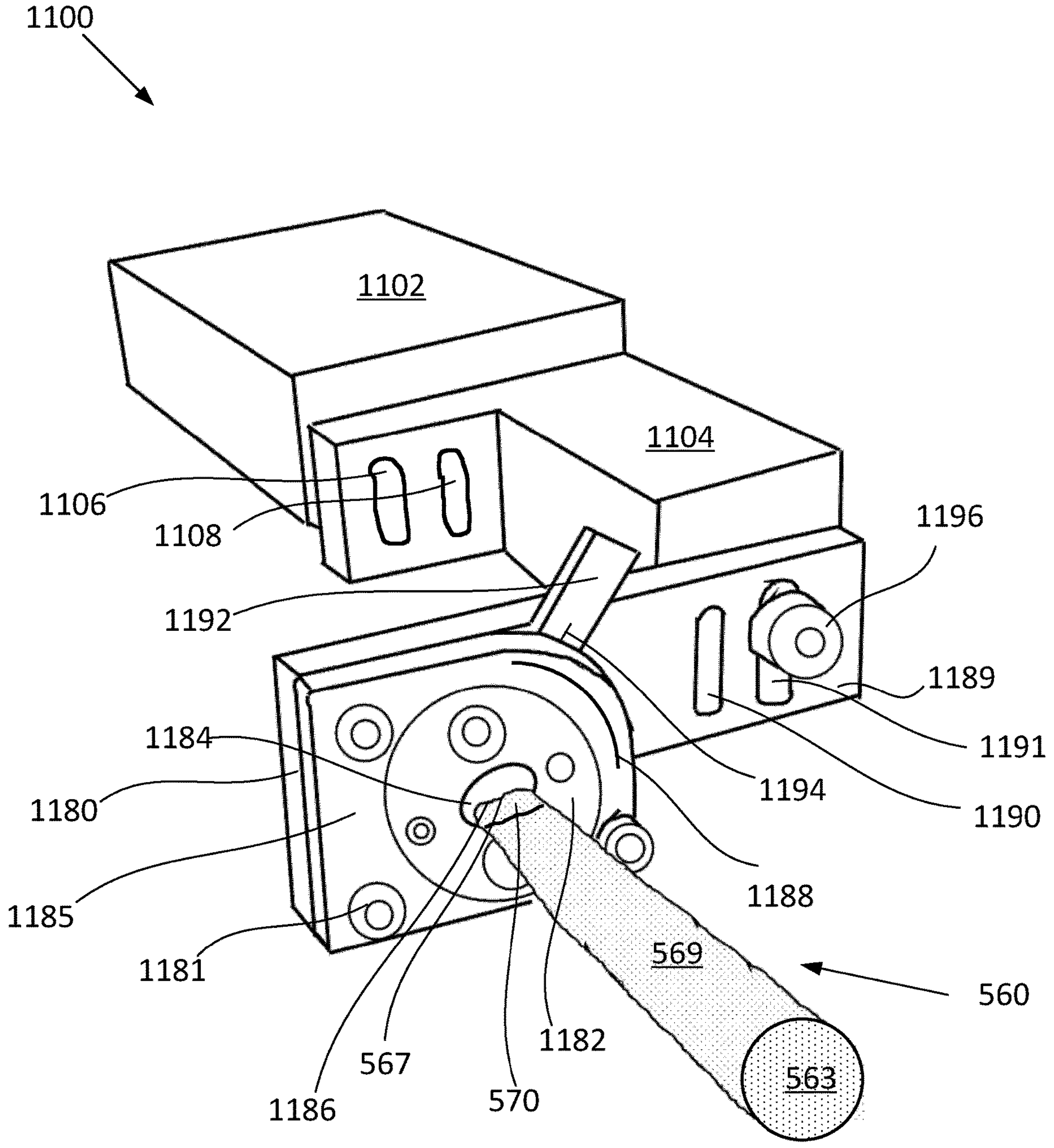
FIG. 5 is a schematic perspective view of the orientation apparatus.

FIG. 5 shows a rotating mechanism 1100 that is used to rotate the inserter. The rotating mechanism 1100 is made up of three main parts: a connector 1102, a height adjustor 1104 and an angling device 1180. The connector 1102 provides a mechanical connection with the manufacturing apparatus, coupling the angling device 1180 to the rest of the apparatus. In some embodiments, the angling device 1180 is coupled via the connector 1102 to a wrapping station. In some other examples, the angling device 1180 is coupled to a cutting station. The rest of the manufacturing apparatus is not limited to the wrapping station and the cutting station. The angling device 1180 has an angling plate 1185 which is mounted to a positioning plate 1189 via receiving a fastener (not shown) inside apertures 1181.

The angling plate 1185 houses a rotary disc 1182 that is coupled to a goniometer having a lever arm 1192 and a scale 1188. The rotary disc 1182 moves within the angling plate 1185 and is rotationally coupled with the lever arm 1192. The lever arm 1192 has a lever marker 1194 that aligns with the scale 1188 to give a visual representation of the angular position of the rotary disc 1182. In this example, the rotary disc 1182 is also provided with disc markers (not shown) to indicate the angular position of the rotary disc 1182. The angling plate 1185 is mounted to a positioning plate 1189 via receiving a fastener inside apertures 1181. The positioning plate 1189 is provided with adjustment apertures 1190,1191. More specifically, the positioning plate 1189 is provided with a main adjustment aperture 1191 and a side adjustment aperture 1190 on either side of the main adjustment aperture 1191. Each of the adjustment apertures 1191 has a generally elliptical shape. The adjustment apertures 1190,1191 are shaped to receive a fastener or a pin (not shown) so as to affix the angling device 1180 to the height adjustor 1104. The adjustment apertures 1190,1191 allow the positioning plate 1189 to be displaced in the vertical direction (up or down) and then fixed in place using a fastener such as a screw-threaded nut, for example. A fastener (not shown) can be received in one or both of the apertures 1190,1191 to tilt the angling device 1180.

More specifically, a first fastener (not shown) can be received in one of apertures 1190 and a further fastener (not shown) can be received in the other of the apertures 1190 at a different height to the first fastener. The height adjustor 1104 is similarly provided with adjustment apertures 1106, 1108. The adjustment apertures 1106,1108 are shaped to receive fastener or pin (not shown) in order to affix the height adjustor 1104 to the connector 1102. The adjustment apertures 1106,1108 allow the height adjustor 1104 to be displaced in the vertical direction (up or down) and then fixed in placed using a fastener (not shown). The rotary disc 1182 has a recessed surface 1184 provided with a slit-shaped aperture 1186 that is configured to receive the end portion of the inserter (not shown). The aperture 1186 is slightly larger than the end portion of the inserter (inserter) so that the inserter end portion (not shown) can be inserted inside the slit 1186. An aperture 1186 takes the form of a slit-shape in this example. The slit-shape of the aperture 1186 corresponds to the planar shape of a susceptor (not shown). The aperture could instead have a cross shape or a circular shape, that corresponds to the desired shape of the susceptor (not shown) or the profile of the inserter end section (not shown), or both desired shape and profile of the susceptor.

An inserter 560 is inserted into the orientation device 1100. The inserter 560 is substantially the same as inserter 460 with reference to FIG. 4 and so will not be described here again in detail. The inserter 560 is hollow, having a tubular shape at an inlet end 563 (an entrance-aperture). That is, towards the upstream end, the inserter 560 has a tubular entrance-aperture 563. Towards the downstream end, the inserter 560 has an end section 567. A channel 569 extends between the upstream end and the downstream end of the inserter 560. A substantial length of the channel 569 is tubular in shape, defining a hollow section of the inserter 560. The end section 567 is rectangular in shape, defining an exit-aperture (not shown). The inserter 560 has a transition portion 570 where the profile of the inserter 560 changes from a tubular profile to a rectangular profile. In some examples, the transition portion 570 is frustoconical in shape. In some examples, the transition portion 570 of the inserter 560 is funnel-shaped, decreasing in diameter towards the end section 567. In some examples, the channel 569 is funnel-shaped.

Still referring to FIG. 5, the inserter 560 is inserted into the angling device 1180. More specifically, the end section 567 of the inserter 560 is inserted into the aperture 1186 of the rotary disc 1182 such that the inserter 560 is held in place within the disc 1182, and thus within the angling device 1180. This allows that the rotary disc 1182 can be rotated, by operating the lever arm 1192 for example, to be set at a desired angle. The inserter 560 is then inserted into the aperture 1186 of rotary disc 1182 such that the inserter is angularly offset. In some examples, the rotary disc 1182 is then secured in the desired position by inserting locking pins or other securing mechanism into receiving apertures (not shown) in the rotary disc 1182. In other examples, a locking nut (not shown) or a locking member (not shown) received on the inserter 560 to prevent the inserter 560 from angular movement around its longitudinal axis. The angular offset of the inserter 560 could be locked and unlocked using a screw and nut system (not shown), for example. The rotary disc 1182 can be rotated while the inserter 560 is inserted into the rotary disc 1182 such that the inserter 560 can also be angularly displaced by operating the lever arm 1192, for example.

In use, the angling device 1180 is positioned in place of the funnel (254, see FIG. 2). In this particular example, the aperture 1186 is aligned with the inlet of the funnel. The end section 567 of the inserter 560 is placed in the aperture 1186 of the rotary disc 1182. The rotary disc 1182 is then rotated such that the exit-aperture of the inserter 560 rotates about the longitudinal axis of the channel 569. The alignment of the marker 1194 of the lever arm 1192 and the scale 1188 indicates the angular offset of the inserter 560 and thus the susceptor. In other examples, the rotary disc 1182 has markings (not shown) which provides a visual representation of the angular offset. Once the angular position of the inserter 560 is locked in place, the angling device 1180 is removed and replaced by the funnel (not shown). The desired angle at which the inserter 560 end section 567 is placed into the funnel (not shown), is thus selected. Thus, a susceptor (not shown) can be inserted from the inlet end 563 of the inserter 560. The susceptor (not shown) is then pulled through the channel 569, towards the end section 567 towards the exit-aperture. The susceptor thus turns inside the inserter 560 as the susceptor enters the inserter 560 from the bobbin (not shown) and exits the inserter 560 through the end section 567 at the desired angle. The continuous sheet of aerosol-generating material (120, see FIG. 2) is then gathered with the susceptor material from the inserter 560, to be wrapped to form a continuous rod (110, see FIG. 2). By feeding the susceptor through the inserter 560, the susceptor is angled to the desired angle, such that when the continuous rod (not shown) is cut, the bending of the susceptor is reduced. In this example, the continuous rod is cut using a rotary cutter (not shown). In one particular example, the cutter rotates at a speed of around 880 revolutions per minute (rpm). Other speeds can be chosen, such as 800, 900 or 1000 revolutions per minute, for example.

In another example of use, a continuous band of susceptor material is provided and a continuous sheet of aerosol-generating material (not shown) is provided. The continuous band of susceptor material is fed through the inserter 560. The exit-aperture of the inserter 560 is positioned in an angling device 580 and rotated to a desired angle such that susceptor material at the end section 567 of the inserter 560 is also rotated. The exit-aperture is secured, and the continuous sheet of aerosol-generating material (not shown) and the susceptor (not shown), which is positioned at the desired angle, is gathered together to form a continuous rod of aerosol-generating material (not shown) and susceptor material. In some examples, the continuous rod is then cut using a rotating cutter (not shown) to form plugs.

The entrance-aperture at the inlet end 563 of the inserter 560 may be rotatable via an angling device (not shown) having substantially the same arrangement as the angling device 1180. An inlet end 563 angling device, in specific examples, comprises a locking arrangement that secures the rotation of the entrance-aperture at a desired position.

Figure 6:
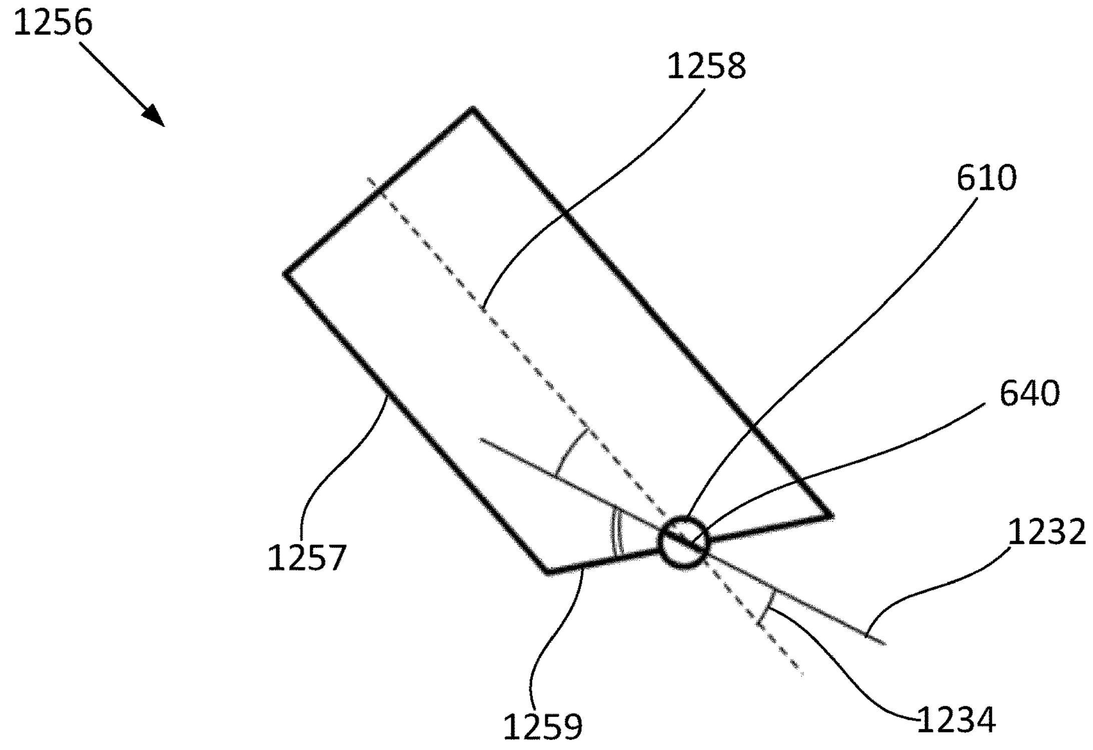
FIG. 6 is a cutter used to cut a continuous rod having a susceptor therein.

Reference will now be made to FIG. 6 which shows a cutter 1256 used to cut a continuous rod 610. The cutter 1256 comprises a blade 1257. The blade 1257 is coupled to a rotary disc (not shown). This allows the blade 1257 to move along a rotary path defined by the disc (not shown) in order to cut the continuous rod 610. In this example, the blade 1257 rotates at a speed of 880 revolutions per minute. The blade 1257 is provided with a cutting edge 1259. The cutting edge 1259 in this example has a rectilinear slope. The blade is 100 mm long in this particular example. The blade is doubled edged. A susceptor 640 is provided inside the continuous rod 610. In this example, the susceptor 640 is positioned 30 degrees from the horizontal in the clockwise direction. In other examples, the susceptor 640 may be positioned at a different angle relative to the horizontal such as 15 degrees, 45 degrees, 60 degrees, 75 degrees, or any suitable angle. Changing the angle of the susceptor 640 also changes the angle 1234 formed between the axis 1232 of the susceptor 640, and the axis 1258 of the blade 1257. The angle 1234 between the axis 1232 of the susceptor 640 and the axis 1258 of the blade 1257 is changed by using the rotating mechanism 1100 as hereinbefore described with reference to FIG. 5. By modifying the angle 1234, the angle of the susceptor 640 reported to the blade 1257 profile is changed. This can be optimised so as to decrease the formation of the susceptor 640 due to the impact of the blade 1257. Moreover, optimising the angle can reduce the forces applied to the susceptor 640 by the aerosol-generating material (not shown). Furthermore, by adjusting the angle of the susceptor 640, the way in which the aerosol-generating material collapses or compresses can be changed. For example, susceptor 640 angle may impact the way that aerosol-generating material compresses inside the funnel (not shown).

Figure 7:
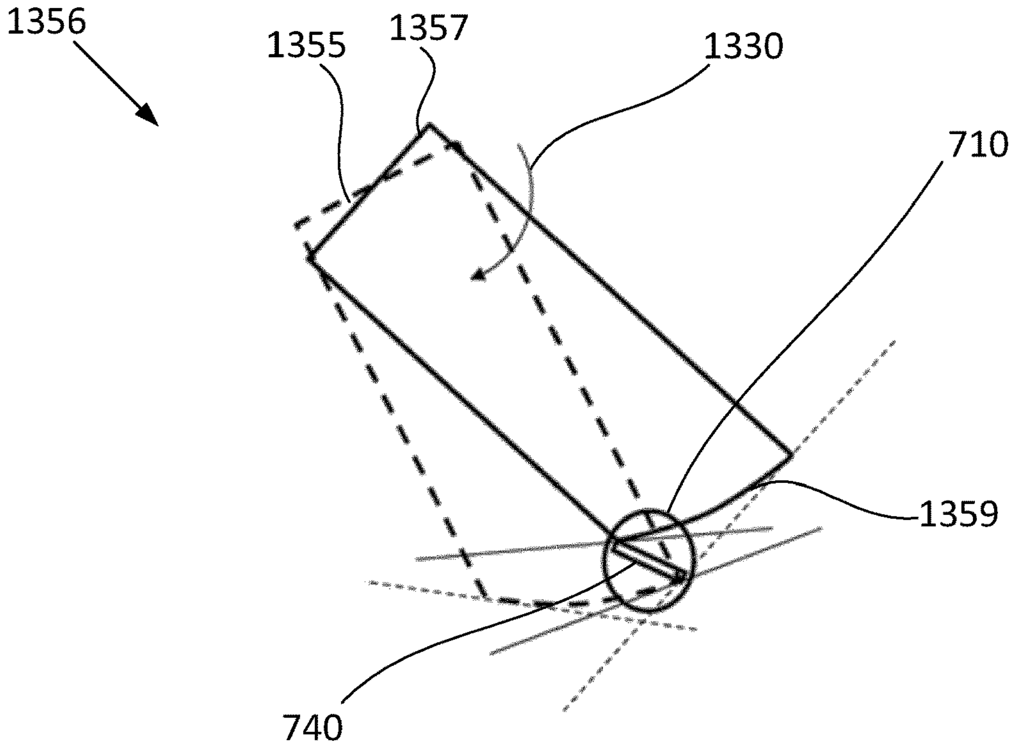
FIG. 7 is another cutter used to cut a continuous rod having a susceptor therein.

FIG. 7 shows another cutter 1356 used to cut a continuous rod 710 having a susceptor 740 inside the continuous rod 710. The cutter 1356 comprises a blade 1357. The blade 1357 is coupled to a rotary disc (not shown) and configured to move along a rotary path defined by the disc (not shown). The blade 1357 in this example has a cutting edge 1359 having a curved profile. The arc of the cutting edge 1359 in this example has a radius of 200 mm. Due to the curvature of the cutting edge 1359, the angle formed between the blade 1357 and the susceptor 740 varies along the cut. The movement of the blade 1357 is generally denoted by the arrow 1330. More specifically, FIG. 7 shows the movement of the blade from a first position 1357 to a second position 1355. Near the start of the cut at the first position 1357A, the angle formed between the blade 1357 and the susceptor 740 is low. The angle then increases from the start of the cut towards the end of the cut due to the arc of the blade cutting edge 1359.

All scientific and technical terms used herein have meanings commonly used in the art unless otherwise specified. The definitions provided herein are to facilitate understanding of certain terms used frequently herein.

As used in this specification and the appended claims, the singular forms "a", "an", and "the" encompass embodiments having plural referents, unless the content clearly dictates otherwise.

As used in this specification and the appended claims, the term "or" is generally employed in its sense including, alternatively or in addition, unless the content clearly dictates otherwise.

As used herein, "have", "having", "include", "including", "comprise", "comprising" or the like are used in their open-ended sense, and generally mean "including, but not limited to". It will be understood that "consisting essentially of", "consisting of", and the like are subsumed in "comprising," and the like.

The words "preferred" and "preferably" refer to embodiments of the invention that may afford certain benefits under certain circumstances. However, other embodiments may also be preferred under the same or other circumstances. Furthermore, the recitation of one or more preferred embodiments does not imply that other embodiments are not useful, and, is not intended to exclude other embodiments from the scope of the disclosure, including the claims.

Any direction referred to herein, such as "top," "bottom," "left," "right," "upper," "lower," and other directions or orientations are described herein for clarity and brevity are not intended to be limiting of an actual device or system. Devices and systems described herein may be used in a number of directions and orientations.

The embodiments exemplified above are not limiting. Other embodiments consistent with the embodiments described above will be apparent to those skilled in the art.

The invention claimed is:

1. An apparatus for manufacturing an aerosol-generating rod, the apparatus comprising:

an inserter for guiding a continuous band of susceptor, the inserter comprising: an entrance-aperture; an exit-aperture; a channel between the entrance-aperture and the exit-aperture; and a rotating mechanism to rotate the exit-aperture relative to the entrance-aperture around a longitudinal axis of the channel;

a gathering mechanism to gather a continuous sheet of aerosol-generating material and the continuous band of susceptor from the inserter; and a wrapper to wrap the gathered material to form a continuous rod.

2. An apparatus for manufacturing an aerosol-generating rod according to claim 1, wherein the inserter further comprises a securing mechanism to secure the rotation of the exit-aperture at a particular position.

3. An apparatus for manufacturing an aerosol-generating rod according to claim 1, wherein the exit-aperture is a slit.

4. An apparatus for manufacturing an aerosol-generating rod according to claim 1, wherein the entrance-aperture is circular.

5. An apparatus for manufacturing an aerosol-generating rod according to claim 1, wherein the inserter further comprises a goniometer.

6. An apparatus for manufacturing an aerosol-generating rod according to claim 5, wherein the goniometer has an aperture through which the susceptor exiting the inserter may pass, the aperture of the goniometer being rotatable around the longitudinal axis of the channel.

7. An apparatus for manufacturing an aerosol-generating rod according to claim 5, wherein the rotating mechanism of the inserter is configured such that when the goniometer rotates around the longitudinal axis of the channel there is also rotation of: the susceptor; the exit-aperture; the entrance-aperture; or any combination of the susceptor, the exit-aperture, or entrance-aperture.

8. A method of positioning a continuous band of a susceptor in an aerosol-generating material comprising steps of:

providing a continuous band of susceptor;

providing a continuous sheet of aerosol-generating material;

providing an inserter, wherein the inserter comprises an entrance-aperture, an exit-aperture; a channel between the entrance-aperture and the exit-aperture, and wherein the exit-aperture is rotatable relative to the entrance-aperture around a longitudinal axis of the channel;

positioning the continuous band of susceptor material through the entrance-aperture of the inserter, along the channel of the inserter and through the exit-aperture of the inserter to exit the inserter;

rotating the exit-aperture of the inserter to a desired angle whereby the susceptor at an exit end of the inserter is also rotated;

securing the exit-aperture of the inserter at the desired angle;

gathering the continuous sheet of aerosol-generating material and the continuous band of susceptor from the inserter; and wrapping the gathered material to form a continuous rod.

9. A method of positioning a continuous band of susceptor in an aerosol-generating material according to claim 8 wherein further comprises the step of: using a goniometer to measure an angle of the continuous band of susceptor as it exits the inserter through the exit-aperture of the inserter.

10. A method of positioning a continuous band of susceptor in an aerosol-generating material according to claim 9, wherein further comprises the step of: placing the continuous band of susceptor through an aperture in the goniometer wherein the aperture of the goniometer is rotatable around the longitudinal axis of the channel of the inserter, such that, the continuous band of susceptor inside the aperture of the goniometer, the continuous band of susceptor in the exit-aperture of the inserter and the exit-aperture of the inserter, are rotated by the same angle as that of the aperture of the goniometer.

11. A method of positioning a continuous band of a susceptor in an aerosol-generating material according to claim 10, wherein further comprises the step: securing the exit-aperture of the inserter at a particular angle such that the susceptor exits the inserter at that particular angle before the continuous band of susceptor is gathered with the aerosol-generating material.

12. A method of positioning a continuous band of a susceptor in an aerosol-generating material according to claim 11, wherein further comprises the step of: removing the goniometer after the exit-aperture of the inserter is secured, and before the continuous band of susceptor and aerosol-generating material is gathered.

13. A method of manufacturing an aerosol-generating rod, the method comprising steps of:

providing a continuous band of susceptor;

positioning the continuous band of susceptor, wherein the step of positioning the continuous band of susceptor comprises positioning the continuous band of susceptor inside an inserter, wherein the inserter has an exit-aperture, an entrance-aperture, a channel between the entrance-aperture and exit-aperture, and the inserter further comprises means to rotate the exit-aperture relative to the entrance-aperture around a longitudinal axis of the channel; inserting the continuous band of susceptor through the inserter, first through the entrance-aperture, along the channel and then through the exit-aperture; rotating the exit-aperture with the continuous band of susceptor in the exit-aperture, to a desired angle; and securing the exit-aperture at the desired angle;

providing a continuous sheet of aerosol-generating material;

gathering the continuous sheet of aerosol-generating material and the continuous band of susceptor; and wrapping the gathered material to form a continuous rod.

14. A method of manufacturing an aerosol-generating rod according to claim 13 further comprising the step of: using a goniometer to measure the angle of the continuous band of susceptor, as it exits the inserter; enters the inserter; or both enters and exits the inserter.

15. A method of manufacturing an aerosol-generating rod according to claim 14, wherein further comprising the step of rotating the goniometer, the continuous band of susceptor, the exit-aperture, the entrance-aperture, or any combination of the goniometer, the continuous band of susceptor, the exit-aperture or the entrance-aperture.

* * * * *